No. 634,937. Patented Oct. 17, 1899.
H. W. BUCK.
SPEED INDICATOR.
(Application filed Aug. 7, 1899.)
(No Model.)
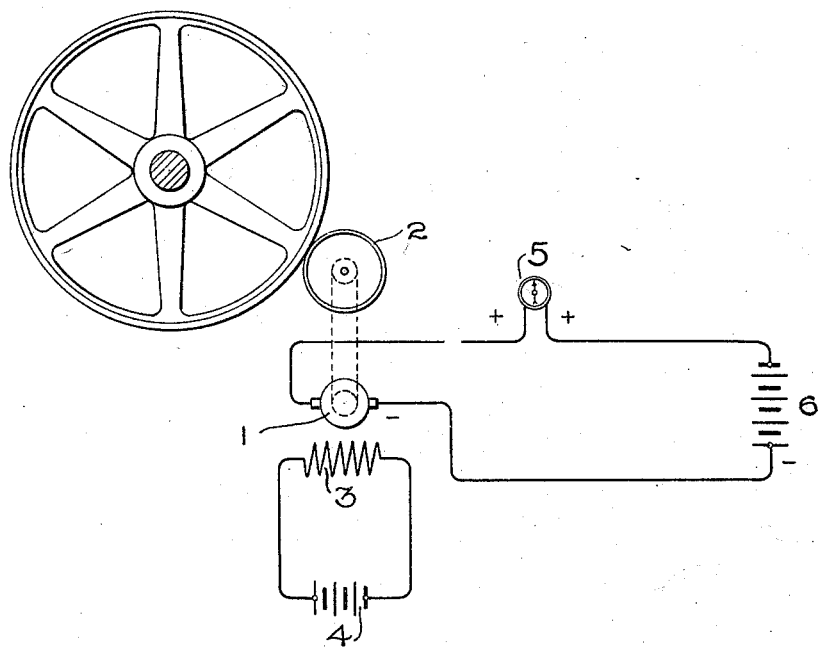
Witnesses
Edward Williams, Jr.
A. F. Macdonald.
Inventor.
Harold W. Buck.
by Albert G. Davis
Atty.

UNITED STATES PATENT OFFICE.

HAROLD W. BUCK, OF SCHENECTADY, NEW YORK, ASSIGNOR TO THE GENERAL ELECTRIC COMPANY, OF NEW YORK.

SPEED-INDICATOR.

SPECIFICATION forming part of Letters Patent No. 634,937, dated October 17, 1899.

Application filed August 7, 1899. Serial No. 726,358. (No model.)

*To all whom it may concern:*

Be it known that I, HAROLD W. BUCK, a citizen of the United States, residing at Schenectady, county of Schenectady, State of New York, have invented certain new and useful Improvements in Speed-Indicators, (Case No. 1162,) of which the following is a specification.

The principal object of my invention is to indicate variations in angular speed of steam-engines or other rotating bodies, although the invention is capable of application also as an indicator of absolute speeds.

In carrying out the invention I employ a small electric generator provided with means for coupling it to the rotating body, the generator being provided with a constant magnetic field and having in its generating-circuit a low-reading voltmeter and a source of opposing electromotive force. With this organization the generator when at its normal speed will balance the opposing electromotive force and the voltmeter will indicate this state by pointing to "zero" on the scale. Any variation of speed, however, in the body which imparts motion to the generator will cause a flow of current in one direction or the other in the circuit, the scale indicating the amount of deflection one way or the other and showing the variation of speed. It is not essential to the main feature of my invention that an opposing source of electromotive force be employed, as the voltmeter may be provided with a retractile spring or agency and the scale capable of adjustment, so that a zero indication will be given when the moving body is operating at normal speed.

The invention may be employed to take absolute speeds, thereby forming an electrical tachometer by calibrating the electric indicating instrument for progressively-varying speeds. In such a use the source of opposing electromotive force is not employed.

The several features of novelty of the invention will be hereinafter more particularly described, and will be definitely indicated in the claims.

In the accompanying drawing, which diagrammatically illustrates my invention, 1 represents the armature of a small electric generator, which is geared or belted to any suitable means for communicating motion from a revolving body. The design as shown comprises an organization for taking the number of revolutions of the fly-wheel of an engine. For this purpose the armature of the generator may be belted to a wheel or disk 2, mounted to rotate in suitable bearings and provided with a yielding periphery, such as a rubber or pneumatic tire, which permits it to firmly engage the periphery of the fly-wheel without tendency to slip and will ride over any slight inequalities or absorb any lateral play.

For the purpose of measuring angular velocities the field-magnet of the generator is constant in value, so that the voltage is directly proportional to the speed. The field-magnet 3 may be excited by a constant source of direct current, as the few cells of the storage battery indicated at 4. In the circuit of the generating-armature are interposed a low-reading voltmeter 5 and a storage battery 6 so coupled in circuit as to oppose the electromotive force of the generator 1. As thus arranged, the index of the voltmeter will stand at zero when the armature is at speed and the engine or moving body is revolving with the normal number of revolutions per minute. Any deviation above or below this speed will be proportionately indicated on the voltmeter.

Obviously the storage battery 6 may be dispensed with and the scale so arranged that its zero indication will be opposite the pointer when the latter is under the tension of the controlling-spring corresponding to the normal number of revolutions, and by a suitable adjusting device for the pointer or scale, the character of which is thoroughly familiar to those skilled in the manufacture of electrical or philosophical instruments, the zero may be set or shifted according to the normal speed of the rotating body.

As only low voltages are necessary to the operation of the invention, a bipolar field may be employed. By calibrating the voltmeter for speed indications and omitting the storage battery 6 the device may be used as a tachometer and the speeds of the rotating body read directly on the scale.

What I claim as new, and desire to secure by Letters Patent of the United States, is—

1. A speed-indicator comprising a dynamo-electric generator, means for communicating to such generator a motion which is a function of the motion of a moving body, a source of constant counter electromotive force, and an indicator in the generating-circuit responsive to changes of voltage, but calibrated to indicate varying speeds of the body.

2. A speed-indicator comprising a dynamo-electric machine having a constant field-magnet, means for communicating the motion of a rotating body to said machine, an electrically-controlled indicator in the circuit, and an independent source of electromotive force giving a bias to said indicator.

3. A speed-indicator comprising a dynamo-electric machine, means for imparting motion from a rotating body thereto, a voltmeter in circuit with the machine, and an opposing source of electromotive force on said voltmeter.

4. A speed-indicator comprising a dynamo-electric machine having a field-magnet of constant strength, means for operating the machine by a rotating body whose angular variations of speed are to be indicated, a voltmeter in circuit, and an opposing source of electromotive force of constant value on said voltmeter.

5. An indicator for variations in angular speed of rotating bodies, comprising a dynamo-electric generator having a constant field-magnet, a wheel with a yielding tire connected with said generator and adapted to engage the rotating body, a voltmeter in circuit with the generator and an independent source of electromotive force giving a bias to said voltmeter.

6. An indicator for showing variations in angular speed of a rotating body, comprising a dynamo-electric machine, a wheel provided with a yielding tire geared thereto and adapted to engage the rotating body, a voltmeter in circuit with the dynamo-electric machine, and a source of constant direct current opposing the electromotive force of said machine.

In witness whereof I have hereunto set my hand this 4th day of August, 1899.

HAROLD W. BUCK.

Witnesses:
BENJAMIN B. HULL,
MABEL E. JACOBSON.